UNITED STATES PATENT OFFICE.

ROBERT DOUGLAS, OF ROCHESTER, NEW YORK, ASSIGNOR TO DOUGLAS PACKING COMPANY, INC., OF ROCHESTER, NEW YORK, A CORPORATION OF NEW YORK.

FOOD PRODUCT AND ITS METHOD OF MANUFACTURE.

1,304,166.     Specification of Letters Patent.     Patented May 20, 1919.

No Drawing.     Application filed August 14, 1913. Serial No. 784,736.

*To all whom it may concern:*

Be it known that I, ROBERT DOUGLAS, of Rochester, in the county of Monroe and State of New York, have invented certain new and useful Improvements in Food Products and Their Method of Manufacture; and I do hereby declare that the following is a full, clear, and exact description of the same.

My present invention relates to the manufacture of fruit jellies, jams and marmalades, and it has for its object to provide a new and improved food product of this character which shall contain practically all of the juices of the fruit from which it is made, and shall also retain the natural flavor and aroma of the fruit. My invention has for its further object to provide a new method of manufacturing jellies, preserves and conserves, whereby a sterilized and jellied fruit preserve can be made without raising the mass treated to the boiling point and without experiencing the loss usually caused by evaporation of the liquid, to the end that the fruit treated will retain its natural taste and bouquet. To these and other ends the invention consists in certain other improvements in the method of producing the improved food product, all as will be hereinafter more fully described, the novel features being pointed out in the claims at the end of the specification.

In carrying out my invention the ingredients selected for the production of jams, jellies and marmalades are mixed with certain proportions of sugar and a proper quantity of a fruit pectin previously obtained from some other source, as will be subsequently described. The amount of the fruit pectin which is added depends both on the nature of the fruit, or fruit juices, to be jellied, and also upon the degree of concentration of such pectin solution. The latter may, for the purpose of this case, be described as the jelly forming substance obtained from fruits and vegetables, which may be caused to yield this constituent element by proper treatment and dehydration and when desired for use can be added to fruit juices in the presence of sugar to produce a satisfactory jellied mass. In practice I prefer to obtain the pectin compound from a cheap and plentiful fruit, such as apples, as it is perfectly adapted to be used with any of the more expensive fruits, and particularly with those which form an imperfect jelly, because of the relatively low amount of pectins which such fruit contains.

In the production of the pectin solution from fruit pulps, I first extract therefrom the fruit juices to remove the natural sugar and flavor, as this treatment renders the pectic substances capable of concentration into a stable syrupy state without jellying, until an admixture takes place in the presence of a syrup containing a proper proportion of sugar and water.

The removal of the juices by extracting them from the fruit pulp carries out of the latter a large percentage of the sugar. This also, in a large measure, removes the flavor from the fruit pulp considered *en masse*. The pectin which is obtained from this deflavored mass of fruit pulp by the treatment to which it is subjected to yield pectin renders the latter free from the flavor of the fruit, or vegetable, from which it is derived, thus also making it substantially flavorless, unflavored, or deflavored. In other words, the pectin, or pectin solution obtained from desugared fruit does not carry with it an appreciable amount of the original flavor of the fruit from which it was obtained, or an appreciable amount of any other flavor that would enable it to be characterized by the sense of taste.

This addition of a pectous substance, such as described above, enables me to successfully make a jam, jelly or marmalade without the necessity of evaporating any considerable portion of the moisture from the mass of crushed fruit or juice. By thus removing the necessity for a material reduction of bulk by evaporation, I am able to secure a uniform finished product of any desired consistency without the use of a thermometer or any test requiring skill.

In the usual production of jams, jellies and marmalades the crushed fruit or fruit juices are boiled with sugar, or with sugar and water in certain proportions, until the desired amount of evaporation takes place, and the whole is brought to such a consistency that upon cooling it will assume a jellied consistency. The serious objection to this process is that as a result of the evaporation which takes place, a large proportion of the delicate flavor of the fruit is lost. In the usual manufacture of pure jams, jellies and marmalade, the boiling of the whole mass is continued until from twenty-five to forty per cent. of the fruit juice has been evaporated. This process not only causes a loss in volume and weight of the fruit, but necessarily greatly dissipates its natural flavor and aroma. Another disadvantage which results from prolonged boiling is the production of foreign flavors due to the chemical changes which take place and further impair the natural flavors.

The general directions for practising my invention may be stated as follows:

The fruit or fruit juice from which the conserve is to be made is mixed with a slightly larger proportion of sugar than would be required in the usual practice where boiling takes place. The pectin is then added and the mixture is heated to a sufficient temperature to dissolve the sugar and sterilize the product. The quantity of pectin necessary depends upon the concentration of such substance and the richness of the fruit or fruit product in natural pectic properties. It may be stated generally that in practice the amount of the pectous substance to be added should be sufficient to combine with the surplus moisture in the fruit juices and the excess sugar to make a firm jelly.

The following example of the proportions which may be employed in the manufacture of strawberry conserve will serve as one illustration of the proportions of the various ingredients which may be combined successfully:

Assuming the use of a pectous solution of such strength that one part when mixed with a syrup composed of four parts of sugar and two parts of water will form a jelly, then I supply four pounds of this pectous solution in combination with thirty pounds of crushed strawberries and forty pounds of cane sugar, which being treated as before described will combine to produce approximately seventy-four pounds of jellied strawberry conserve of commercial consistency.

Substantially the same quantities of ingredients may be used to make a fruit jelly by using the expressed juice of the fruit obtained by pressing the latter in either heated or cold condition.

The addition of fruit pectins in a concentrated form overcomes many difficulties in the manufacture of jams and jellies of proper consistency, and not only enables the house-wife and manufacturer to be sure of producing a firm jelly, or jam, from any fruit, but also enables a conserve to be obtained, the weight of which is equal to the combined weight of the fruit, sugar and added pectins, because there is no considerable loss by evaporation in cooking, and for this reason, also, the natural flavor and aroma of the fruit is retained.

The sterilizing of the fruit mixture is accomplished at a temperature lower than the boiling point, or before the fruit mass begins to boil, but no harm results if the product is brought to the boiling point if it is not held at this temperature long enough to cause any considerable loss by evaporation. In practising my invention the operator may discontinue the cooking process after the fruit has become sterilized, or he may carry it on to the point of ebullition, which is a most convenient way of determining when the mass has reached the required degree of temperature, when it should be allowed to cool.

I claim as my invention:

1. A jellified conserve composed of crushed fruit, sugar dissolved in the fruit juice and a concentrated pectous solution of sufficient strength to combine with the sugar and surplus water of the fruit to jellify the mass without material reduction of volume by evaporation.

2. The process of making jams or conserves consisting in adding to crushed fruit and sugar a concentrated pectous solution, heating the mass sufficiently to sterilize it without producing evaporation by prolonged boiling and subsequently allowing the mass to cool.

3. A fruit jelly made from sugar syrup to which is added an acid solution of concentrated fruit pectins in sufficient quantity to form jelly without prolonged boiling.

4. A fruit jelly made by mixing fruit juices with sugar and dehydrated fruit pectins producing a jelly formation of any desired consistency without boiling of the mixture.

5. The process of making fruit jellies consisting in adding to fruit juice, a given quantity of sugar and a proportional quantity of concentrated fruit pectins sufficient to jellify the mass without prolonged boiling.

6. Unflavored pectin, treated with fruit pulp, sucrose and water.

ROBERT DOUGLAS.

Witnesses:
 MARION COOK,
 LUCY A. VAN COURT.